(12) United States Patent
Arterburn

(10) Patent No.: US 7,194,875 B2
(45) Date of Patent: Mar. 27, 2007

(54) FIBERIZING BUSHING WITH IMPROVED SCREEN

(75) Inventor: Russell Donovan Arterburn, Athens, TN (US)

(73) Assignee: Johns Manville, Denver, CO (US)

( * ) Notice: Subject to any disclaimer, the term of this patent is extended or adjusted under 35 U.S.C. 154(b) by 516 days.

(21) Appl. No.: 10/421,683

(22) Filed: Apr. 23, 2003

(65) Prior Publication Data

US 2003/0205067 A1 Nov. 6, 2003

Related U.S. Application Data

(63) Continuation of application No. 08/929,836, filed on Sep. 15, 1997.

(51) Int. Cl.
*C03B 37/02* (2006.01)

(52) U.S. Cl. ............... 65/474; 65/475; 65/495; 65/493

(58) Field of Classification Search ............ 65/475, 65/474, 495, 540, 481, 471, 393
See application file for complete search history.

(56) References Cited

U.S. PATENT DOCUMENTS 3,264,076 A * 8/1966 Veazie .................. 65/474
3,556,753 A * 1/1971 Glaser ................... 65/474
3,628,930 A * 12/1971 Harris ................... 65/212
3,765,852 A * 10/1973 Shule ................... 65/540
3,810,741 A * 5/1974 Stalego ................. 65/474
4,330,312 A * 5/1982 Hill .......................... 65/1
4,436,541 A * 3/1984 Pellegrin et al. ........ 65/476
4,612,027 A * 9/1986 Marra ................... 65/471
4,624,693 A * 11/1986 Marra et al. ............ 65/471
4,664,688 A * 5/1987 Grubka ................. 65/471
5,709,727 A 1/1998 Bobbs

FOREIGN PATENT DOCUMENTS

SU 722860 * 3/1980 ............ 65/495

* cited by examiner

Primary Examiner—John Hoffmann
(74) Attorney, Agent, or Firm—Robert D. Touslee

(57) ABSTRACT

A bushing for fiberizing molten material, such as molten glass, having a screen mounted in the bushing spaced above the tip or orifice plate with a central portion of the screen having a significantly lower percent of hole area than the percent of hole area in end portions of the screen. This bushing improves fiberizing efficiency in channel positions of a fiberizing operation. Also, such a screen can be laid on top of a conventional screen to convert a normal bushing to a channel position bushing. Methods of using these types of bushings to improve fiberization in the channel positions and for modifying conventional bushings for other uses are also disclosed.

37 Claims, 6 Drawing Sheets

FIBERIZING BUSHING WITH IMPROVED SCREEN

This application is a continuation of application Ser. No. 08/929,836, filed Sep. 15, 1997.

BACKGROUND

The present invention involves an improved bushing apparatus for making glass fibers and an improved method of making and using glass fiberizing bushings.

In the manufacture of continuous fibers from a molten material like molten glass, the molten material is often generated by a tank furnace and distributed to a plurality of fiberizing bushings via one or more channels and one or more bushing legs connected to the channel(s). Each bushing leg comes off the channel at about 90 degrees and contains a plurality of bushings that are spaced apart. The molten material exiting the tank furnace into the channel(s) is much hotter than desired for fiberizing and the molten material entering the bushing legs is typically hotter than desired for fiberizing, particularly when the furnace is being run close to designed capacity.

Precious metal bushings for making continuous glass fibers are well known, having been in use for more than 50 years. Many types of bushings exist for converting molten glass into continuous glass fiber and products. Typical types of bushings are shown in U.S. Pat. Nos. 3,512,948, 4,155,732, 4,272,271 and 4,285,712, the disclosures of which are hereby incorporated by reference. All the bushings shown in these patents teach the use of a perforated plate or screen, welded to the end walls and side walls at some distance above a tip plate containing hundreds of nozzles or tips where molten glass, as it emerges from the orifice of each tip, is converted to a continuous glass fiber in a known manner. These patents teach that the purpose of the screen is to condition the glass, homogenizing the chemistry and temperature, and to prevent pieces of refractory or unmelted glass from reaching the tip plate. Most, if not all, of these references teach using a uniform hole pattern with uniform hole size over the entire surface of the tip plate. Normally, the screens taught by these references improve the temperature profile of the tip plate, i.e. produce a more uniform temperature in the molten glass just above the tip plate in all directions than if the screen were not present.

These bushings work well as long as the molten material entering the bushings is fairly uniform in temperature, but often there is at least a streak of molten material in the flow that is significantly hotter than the molten material next to the walls of the channel. This hotter material has a lower viscosity than the cooler material next to the walls. When it enters the bushing, always in the first position next to the channel and sometimes in the second position of a bushing leg, it flows through holes in a conventional screen in the bushing faster than the cooler material. This causes the temperature profile of the tip plate spaced below the screen to be non-uniform. When this happens, a generally central portion of the length of the bushing tip plate runs considerably hotter than the ends. This hotter central portion can be offset to the down stream end due to the velocity vector of the hotter stream of glass. The hot glass has a higher velocity down center of the bushing leg and down the orifices to the bushings than the colder glass next to the walls and bottom.

The first position in each of the legs, the positions next to the channel, are called channel positions. The channel position in each leg has the most glass passing over it than any of the remaining bushings in the leg, and the velocity of the molten glass passing over the channel positions can be significantly higher than it is further down the leg. When hot glass dives into the orifices feeding the channel positions, it substantially increases the break rate of the bushing and also increases the variation of the fiber diameters of the fiber coming from the bushing due to the higher temperature gradient this condition causes across the tip plate.

The use of a screen having a non-uniform hole size and/or hole density is taught by U.S. Pat. No. 4,612,027, but this reference does not suggest using that screen for addressing the above described problem. This patent teaches making a bushing having a dripless tip area and a dripping tip area in the tip plate of the bushing. The bushing taught by this patent has a screen that has much less resistance to flow in the center portion of the screen than the portion or area adjacent each end of the screen, i.e. the center portion of the screen has much larger holes and/or a higher hole density than the areas of the screen adjacent each end of the bushing. Also, the bushings taught by this patent must have vertical walls extending from the top of the tip plate to the bottom of the screen to separate the areas of different rates of molten glass flow to function as taught. Nothing in this patent discloses or suggests a solution to the problem of bad tip temperature profile in channel positions and the negative results this condition causes. Instead, this patent accepts that the tips on the outer periphery break out more frequently and teaches a bushing that tolerates such frequent fiber breaks and lower fiberizing efficiency.

SUMMARY OF THE INVENTION

It has been discovered that if the hole density, number of holes per unit area, and/or the hole diameter, is decreased in the screen in the area above where the hotter glass flow negatively affects the tip plate temperature profile, the temperature profile of the tip plate is greatly improved. This discovery has led to bushings for the channel positions that allow fiberization in the channel positions with much improved efficiency, compared to using conventional bushings in these positions, and similar efficiency to other positions. This invention also reduces the fiber diameter variation of the fibers produced from the channel positions. However, these bushings, so designed and built for the channel positions, are often not acceptable for non-channel positions because the tip plate of this bushing has a bad temperature profile in all positions except the channel positions and sometimes in the second position from the channel. When the reduced hole area portion of the screen is placed in the center lengthwise and is not offset significantly, the bushings will also perform satisfactorily in non-channel positions, but this type of bushing will sometimes not optimize channel position performance.

The present invention includes a bushing for making fibers from a molten material comprising at least one sidewall and a tip plate or orifice plate through which molten glass flows to form the fibers, and a screen having a plurality of holes (orifices) therethrough and mounted on the interior of the bushing and spaced above the top of the tip plate or orifice plate, said screen having holes therein and being attached to said sidewall, the improvement comprising a generally mid or central portion of the screen having a hole area per unit area of screen that is smaller than the hole area per unit area of screen of end portions on either side of the mid or central portion. The present invention also includes the method of making this inventive bushing and of using this type of bushing to make fibers including using this bushing in the channel positions.

While this solution solves the channel position tip plate temperature gradient problem, using a different bushing design in the channel positions than is used in the non-channel positions requires that many more bushings be inventoried. This is aggravated by needing two types of the bushing made according to the present invention in addition to the conventionally designed bushing. Two types of bushings are needed to maintain the same front to back orientation of the bushings on both sides of the channel. The same orientation is important to fit auxiliary equipment for the bushing like water cooling lines and thermocouple connections. The area of the screen where smaller and/or fewer holes/unit area are placed for decreased flow on channel positions is frequently not in the center of the bushing, lengthwise, so bushings designed for the channel position on one side of the channel will not work for the channel positions on the opposite side of the channel. These bushings are made from precious metal alloys, such as 78 percent platinum and 28 percent rhodium, which are more expensive than gold. This increase in bushing inventory and precious metal inventory required, compared to a situation where there is only one type of bushing, ties up substantial additional valuable capital assets from use elsewhere in the operation.

The present invention includes a bushing for making fibers from a molten material comprising at least one sidewall and a tip plate or orifice plate through which molten glass flows to form the fibers, and a first screen having a generally uniform hole size and density spaced above said tip plate, said first screen having holes therein and being attached to said sidewall, the improvement comprising a second screen having holes therein and lying on top of said first screen, at least some of the holes in said second screen aligning with holes in said first screen, the area of the holes per unit area of screen in said second screen being less than the area of holes per unit area of screen in said first screen. The present invention also includes a method for making fibers using such a bushing.

The present invention also includes the use of a screen or perforated plate (screen) having smaller hole sizes and/or hole densities in at least one area of the screen than the hole diameter or size and/or hole density in the remainder of the screen with bushings designed for non-channel positions to produce a bushing that works well in channel positions on either side of the channel. The inventive screen lies on top of the conventional screen in the bushing. The resultant bushing is also a part of the present invention, as are the methods for making bushings for a channel position. This invention greatly reduces the number of new bushings and the amount of precious metal that must be inventoried in each plant or for each furnace.

This bushing has a first screen welded to the sidewalls and endwalls of the bushing, or to the flange of the bushing, in a normal way, the first screen having a uniform hole size and hole density in the area of the screen containing holes or openings, and a second screen lying on top of the first screen, the second screen having a non-uniform hole size and/or hole density with the hole size and/or hole density in a center portion being smaller than the hole size and/or hole density in end portions of the screen. The second screen does not have to be welded to any part of the bushing, but it can be tacked, pinned, riveted or otherwise attached in one or more places to keep it from moving and to maintain acceptable alignment of the holes in the first and second screens as they sag with age.

The bushing of the present invention is made by welding a screen having a non-uniform hole pattern, hole density and/or hole diameter into a standard bushing, or by laying a screen having a non-uniform hole pattern, density and/or hole size on top of a conventional screen of a conventional bushing. In all embodiments of the present invention, the percent of hole area of top or second screen, based on the total area of the top screen, is significantly smaller than the percent of hole area of the first or bottom screen, based on the total area of the first or bottom screen. By significantly smaller or lower is meant at least about 5 percent, preferably at least about 10 percent, and most preferably at least about 20 percent, such as 25 percent, 30 percent or more.

When the inventive screen is not symmetrical from end to end, which it can be, the screen can be laid in face up to make a bushing for a channel position on one side of the channel or flipped over and laid in face down to make an inventive bushing for a channel position on the other side of the channel. Thus, in one embodiment of the present invention, only one kind of bushing and one kind of additional lay-in screen need be inventoried. This reduces the amount of precious metal in new parts inventory at a plant or for each furnace substantially while solving the tip plate temperature gradient problem on channel, and sometimes second, positions.

The present invention also includes a method for making fibers from molten material using conventional fiber making processes except for the use of one or more of the bushings of the present invention in the manner described in detail below. When the term hole density is used herein, it means the number of holes per square inch of screen area in the portion of the screen being described. While round holes are preferred and are used to describe the present invention, other shapes of holes can be used in the present invention. In some embodiments, the percent of hole or open area in the central or center portion of the screen of the invention is significantly less than the percent of hole or open area in the remainder of the screen. Hole density is directly proportional to percent open area in the portion of the screen being defined. The hole size, as used herein to describe the invention, means the diameter of the holes in the screen, or a portion of the screen, or the area of the holes, unless otherwise defined.

BRIEF DESCRIPTION OF THE SEVERAL VIEWS OF THE INVENTION

DETAILED DESCRIPTION OF THE INVENTION

In the direct melt method for making glass fiber, a glass melting tank converts glass batch to molten glass and conditions the glass to remove most of the entrained gasses and to reduce the temperature below that used to melt the batch. Molten glass is removed from the melting tank or refining chamber through a submerged throat and into one or more channels which confines and transports the glass towards bushing legs in which a plurality of spaced apart bushings converts the molten glass into glass fiber. While almost any glass can be made into fiber, the most commonly used is well known E type glass which is a lime-alumina borosilicate. It is also known to use sodium boro-silicate glasses to make fiber. The present invention is usable with any molten material, including any organic materials and any glass compositions that can be made into a fiber using a fiberizing bushing.

Figure 1:
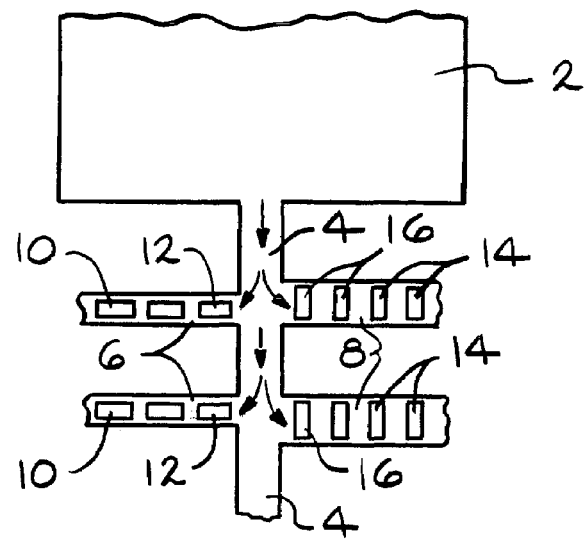
FIG. 1 is a vertical cross section of a portion of a typical fiber glass furnace showing a glass melting furnace or tank, a channel, four bushing legs and numerous spaced openings in the bottom of each leg for bushings, or positions for bushings.

Referring to FIG. 1, which is a horizontal cross section taken below the glass line of a portion of a conventional direct glass melting and fiberizing system, the batch is melted in a glass tank 2 and is refined in the downstream portion of the tank 2. Refining includes lowering the temperature of the molten glass significantly below the maximum temperature of the molten glass. To thoroughly melt batch completely at a competitive rate, it is necessary that the molten glass reach a temperature several hundred degrees hotter than the fiberizing temperature of the glass. Some of this excess temperature can be removed in the refining end of the melting tank, but the temperature of the molten glass is still much too hot to fiberize when it enters one or more channels 4.

While FIG. 1 shows only one channel 4, that channel can split into two or more channels, or two or more channels can emerge from the tank 2. The channel 4 confines the molten glass on its journey to one or more bushing legs 6 and 8. Although the molten glass loses temperature as it runs through the channel 4, at least when pulling a furnace at or near the maximum rate, the temperature of the molten glass is still too hot for good fiberization. When this condition exists, the glass in the center of the flow tends to be the hottest and runs faster than the cooler glass closer to the walls and the bottom of the channel. This hottest glass tends to dive into the first, and sometimes the second, bushing positions 12 and 16 in the bushing legs. FIG. 1 shows two ways that bushings are typically oriented in the bushing legs 6 and 8. In legs 6, the bushing length is parallel to the length of the leg and in legs 8, the bushing length is perpendicular to the length of the leg. While two different orientations are shown here on the same fiberizing operation or furnace, normally the bushings would be oriented in the same direction in each leg of a fiberizing operation or furnace.

Figure 2:
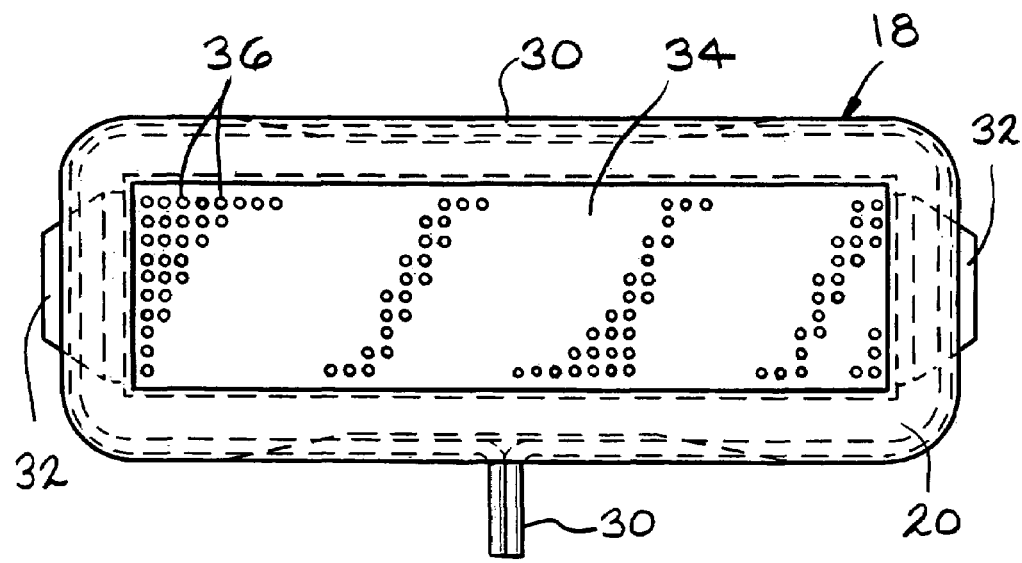
FIG. 2 is a schematic view of a typical conventional tip type bushing for making continuous fiber from a molten material and having mounted therein a conventional bushing screen.
Figure 3:
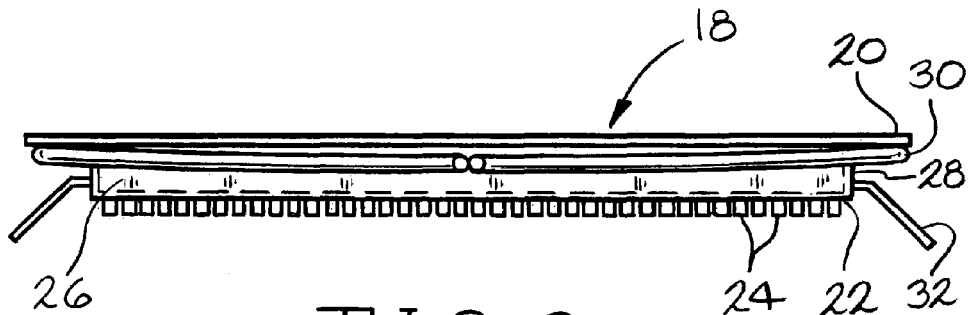
FIG. 3 is a plan view of a conventional bushing screen having a uniform hole size and density.

Mounted below each leg and spaced apart are a plurality of conventional bushings, such as shown in FIGS. 2 and 3, for converting the molten glass into fibers. These bushings 18 include a flange 20 at the top of the bushing for sealing to a refractory bottom of the legs 6 and 8 and are centered under vertical orifices that measure about 16.5 to about 20 inches long and about 1-3 inches wide. The molten material such as glass flows down into the bushings 18 through these orifices.

Referring again to FIGS. 2 and 3, conventional bushings 18 also include a tip plate or orifice plate 22, usually having a plurality of tips 24 thereon. Some bushings do not have tips 24, but fiberize directly from the orifices in the orifice plate 22. The tip plate 22 is welded to bottom edges of sidewalls 26 and endwalls 28. Top edges of the sidewalls 26 and endwalls 28 are welded to the flange 20. A water cooled tube loop 30 is mounted under the flange to freeze the molten material and form a seal with the refractory bottom of the legs 6 and 8. The bushing 18 is normally made from platinum or a platinum-rhodium alloy in which the major portion is platinum when used to fiberize glass and other corrosive materials. The bushings are normally heated, usually electrically heated by their own resistance with power cables (not shown) connected to terminal ears 32 on each end of the bushing. The entire bushing assembly is mounted in an insulating refractory castable in a metal frame in a known manner. The metal frame connects to a superstructure of the fiberizing operation or furnace to hold the bushing 18 in place.

The conventional bushing 18 shown in FIGS. 2 and 3 also contains a screen or screen plate 34 whose edges are usually welded to the inside of the sidewalls 26 and the endwalls 28, but the screen 34 can also be an integral part of the flange 20, or can lie over the flange 20. The screen plate 34 is spaced above the tip plate 22 by varying amounts, but typically the bottom surface of the screen 34 is about 1.9375 inches above the top surface of the tip plate 22. This spacing can be larger or smaller, and it can change with operating age since the screen usually operates at a higher temperature than the tip plate and sags more. The screen plate has a plurality of holes or orifices 36 and is typically about 0.09–0.15 inch thick. The purpose of the screen is to catch any large pieces of refractory or other unmelted debris in the molten material and prevent them from getting to the tip plate 22 where they would interfere with molten glass getting to the tips, and to condition or homogenize the temperature, viscosity and chemistry of the glass. Typically the holes in a conventional screen are about 0.053–0.057 inches in diameter and the hole density is about 80–120 holes per square inch.

The upstream end of the first orifice in each leg 6 or 8 is typically about 12–30 inches from the edge of the channel, depending upon the leg design and the orientation of the bushing in the leg. The hottest glass, and highest velocity glass, running into the legs 6 and 8 tends to dive into the center portion of the first position in the leg, and on some legs also into the center of the second position. The hot streak of glass flows right on through the conventional bushing screen and down to the tips. The colder glass surrounds this hot glass such that the tips at the ends of the bushings in the channel positions, or around the periphery of the bushings when the bushing length is perpendicular to the leg, run colder. This is not desirable because the tips on the outer periphery tend to run colder anyway because of the cool air flowing into the fiber array. When the bushing is heated up to make the tips in the outer periphery run better, then the center of the bushing is too hot and runs fibers having a coarse fiber diameter or breaks out.

Figure 5:
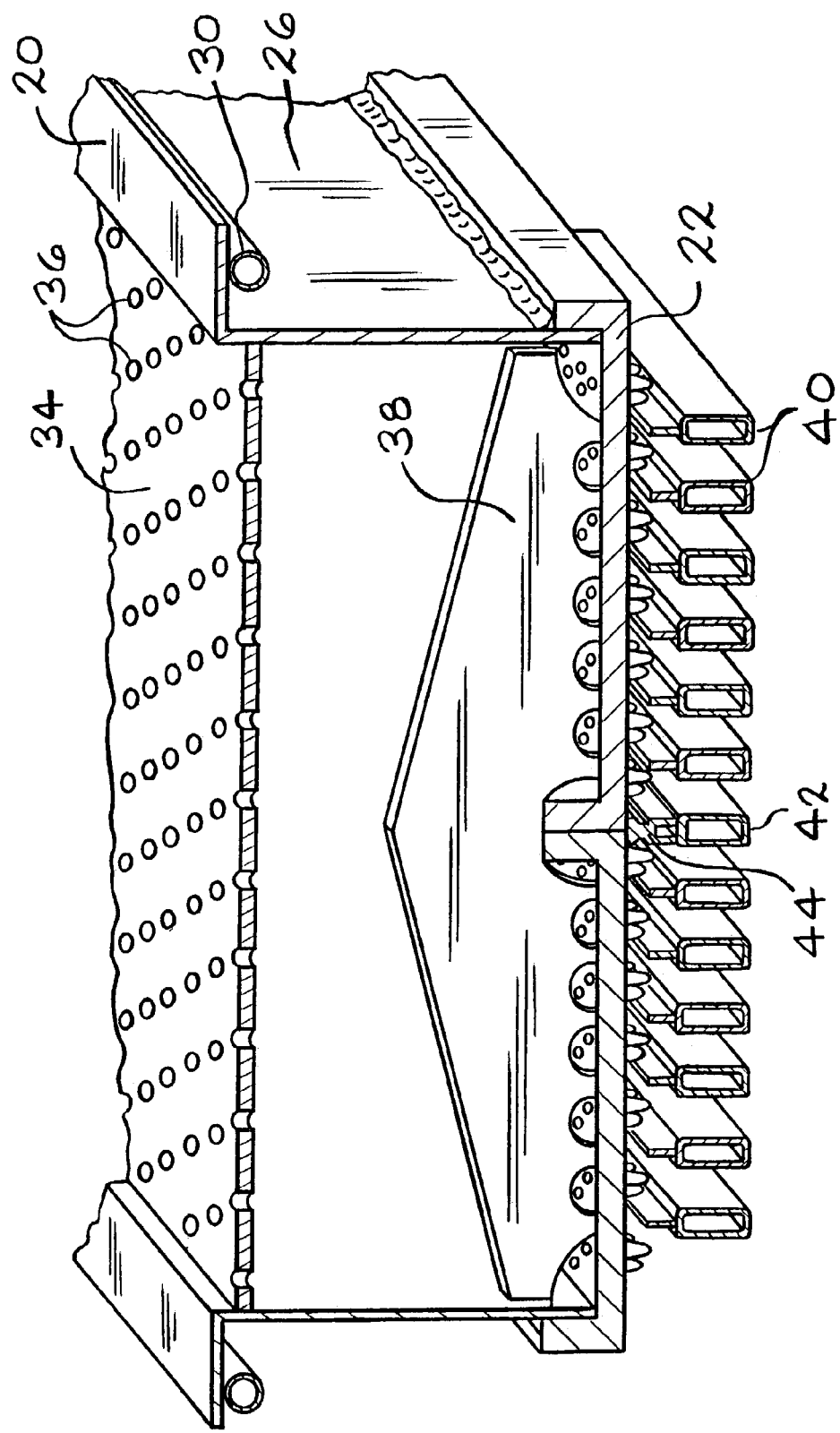
FIG. 5 is a crossectional perspective view of a conventional tip type bushing, having a conventional screen plate having a uniform hole size and hole density, that was modified with the present invention to produce the preferred embodiment of the invention.

The present invention solves these problems by changing the flow of glass through the screen plate to compensate for the different temperatures of molten material like glass flowing onto the screen plate. FIG. 5 is a cross section of a prospective view of a portion of a conventional bushing for making glass fiber. This bushing is like the bushing shown in FIGS. 2 and 3 and one type of bushing used in the present invention. In addition to the elements shown in FIGS. 2 and 3 and described above, this figure shows internal support ribs 38 which are welded to the top of the tip plate 22 to retard sagging of the tip plate 22 due to the high operating temperature and the head of molten glass pressing down on the tip plate. This figure also shows conventional finned water cooled tubes 40 below the tips for cooling the tips and the molten glass forming the fiber. The center tube 42 has two fins and a refractory piece 44 setting on and running along the tube 42 between the two fins to support the center of the tip plate along its length. The cooling tubes are supported by conventional hardware not shown here. Note that the internal support ribs 38 do not impede or contain the molten glass as they do not extend to the screen plate and have numerous openings along the bottom portion of the rib to allow molten glass to flow past the support rib 38.

While the bushing described above is a cooling tube type bushing, the invention is equally useful on bushings that use other means of cooling such as well known blade like fins, well known forced air cooling, or only ambient air cooling. The method of cooling the tips, orifice plate and molten glass emerging from the tips or orifices in the orifice plate is not critical to the present invention.

Figure 6:
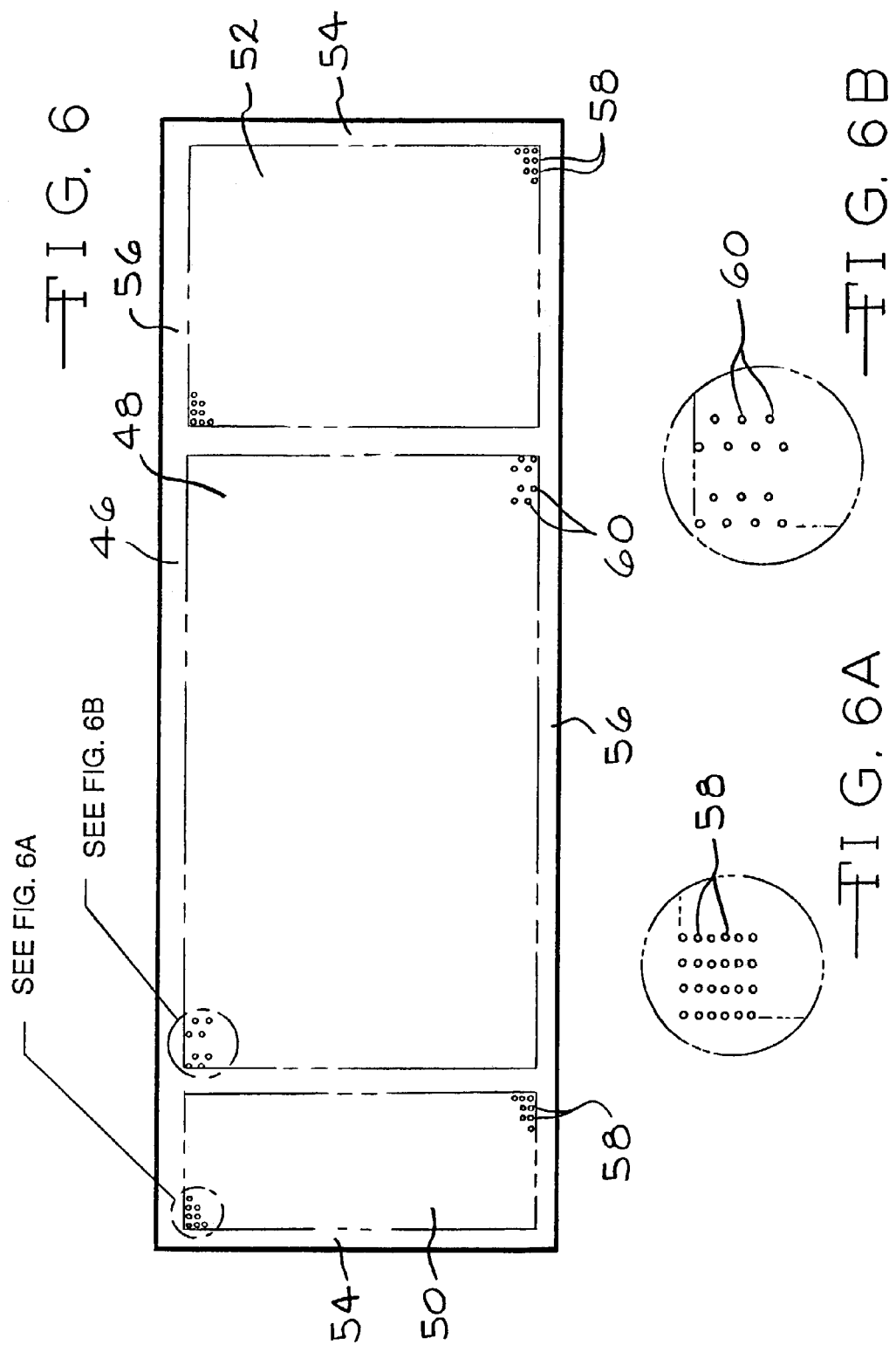
FIG. 6 is a plan view of a bushing screen design according to the present invention for use in the channel positions on either side of a channel in bushings whose length runs parallel to the length of the bushing leg.

FIGS. 6, 6A and 6B show a preferred screen according to the present invention. The screen 46 has a low flow center portion 48 which provides more resistance to flow than a first end portion 50 and an opposite end portion 52 which are medium flow portions. This screen is for channel position bushings which are mounted in the legs with the length of the bushing running parallel with the length of the leg. In this embodiment of the present invention the holes are all about 0.55 inch in diameter, but the hole densities are different. The hole density in the center portion 48 is about 20 holes per square inch while the hole densities in the two end portions are about 60 holes per square inch. The difference between the first, or channel, end portion 50 and the opposite end portion 52 is that the first hole portion 50, which is positioned to be closest to the channel 4, is smaller than the opposite end portion which is farthest from the channel 4 when mounted in a bushing and the bushing is installed in a leg. The dimension of the first end portion 50, along the length of the screen 48, is about 1.33 inch, the length of the center portion 48 is about 9.12 inch and the length of the opposite end portion 52 is about 2.05 inches in the most preferred embodiment. A band of the screen around the periphery is free of holes. The end portions 54 of the band are preferably about 0.27 inch wide and the side portions 56 of the band are preferably about 0.37 inch, but other band widths would be suitable.

FIG. 6A is a plan view of a portion of the end portions 50 and 52 of the screen 46 showing how the holes in the end portions are arranged. The centers of the holes 58 preferably line up in both the length and width directions of the screen 46. The distance between the center lines of the rows of holes 58 in the length direction is preferably about 0.1 inch and the distance between the center lines of adjacent rows of holes in the screen width direction is preferably about 0.19 inch, but other hole arrangements and spacings can be used to achieve similar percent open area in the end portions 50 and 52 of the screen 46. Preferably, the percent open area in the two end portions 50 and 52 of the screen 46 is about 13.5 percent, but can be within the range of about 10 percent and about 16 percent.

FIG. 6B is a plan view of a portion of the center portion 48 of the screen 46 showing how the holes 60 in the center portion are preferably arranged. Compared with the rows of holes in the end portions 50 and 52, every third row of holes in the width direction of the screen are missing. Also, in the rows of holes in the width direction, the centers of the holes 60 are preferably twice as far apart. Also, the holes in each row in the width direction are offset from the holes in the adjacent row of the center portion 48. The distance between the centers of the holes in a row in the width dimension of the screen 46 is preferably about 0.2 inch, but other hole arrangements and spacings can be used to achieve similar percent open area in the center portion 60 of the screen 46. Preferably, the percent open area in the center portion 48 of the screen 46 is about 4.2 percent, but can be within the range of about 2.5 percent and about 6 percent.

The thickness of the screen 46 can be as thin as the capability of the equipment used to make the screen. The screen described in FIG. 6 had a thickness of about 0.009 to about 0.015 inch, preferably about 0.009 to about 0.011 inch. With the right equipment, a thinner screen can be made and will be suitable. The rate of flow of molten material through the screen can also be controlled by using different screen thicknesses, i.e. a thicker screen in the low flow portion of the screen than the thickness of the medium flow portions of the screen. This method of modifying the flow through the screen is not preferred when making fibers requiring precious metal screens because of the high cost of precious metal. The bushing screen can be made by drilling, punching or otherwise making holes, slits or other openings in a precious metal sheet, or by weaving precious metal wire in a known manner to produce-the openings prescribed above.

The screen of the invention can be used in a bushing of the type shown in FIGS. 2, 3 and 5 in place of the conventional screen 34 in which case the screen 46 would be welded to the sidewalls and endwalls of the bushing in the conventional manner. The bushing cannot be turned end for end to use on either side of the channel 4 because of auxiliary equipment used with the bushing. The screen 46 can be flipped over or turned end for end, or both, to make bushings for the channel positions on the opposite side of the channel 4, keeping the smaller medium flow end portion 50 closest to the channel 4 when the bushing is installed. This mode of the invention corrects the poor efficiency of the channel positions and fiber diameter variation problems when using conventional bushings, but requires that three different types of bushings be inventoried, the conventional type and a different type for each side of the channel.

Figure 9:
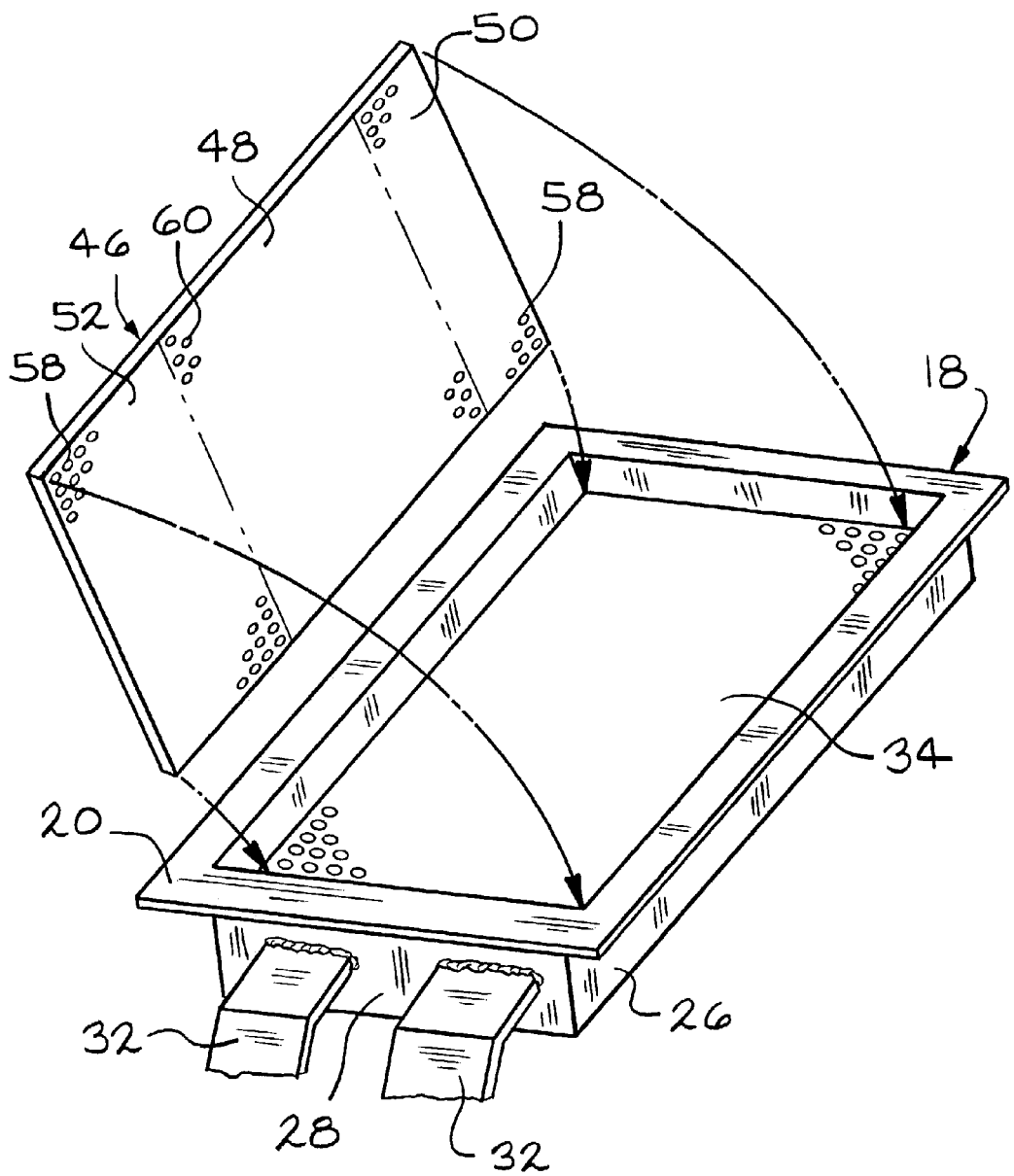
FIG. 9 is a perspective view of a bushing using a screen according to the present invention.

The preferred mode of the invention eliminates much of the additional inventory by requiring only conventional bushings and one or more screens 46 as shown in FIG. 6. When preparing a bushing for a channel position, the screen 46 is simply placed inside the conventional bushing to lay on top of the conventional screen 34, as shown in FIG. 9. To economize on precious metal, the length of the screen 46 is shorter than the length of the conventional screen 34 to avoid placing blank metal over blank metal, since screen 34 also has a blank band around its periphery that is similar to the blank band around the screen 46.

When the screen 46 is placed into the bushing 18, making sure the short end portion 50 is on the channel end of the bushing, the screen 46 is centered on the screen 34 and slight adjustment is made to line up the holes in the screen 46 with holes in the screen 34 as well as possible. The screen 46 is the same on the top as the bottom so it can be flipped end over end, or turned around in a horizontal plane, if necessary, to place the short medium flow end portion 50 in the proper end of the bushing. The screen can be left loose; but to insure it doesn't shift during transporting to the furnace leg and installing, the screen 46 can be secured to the screen 34 at each end with a few tack welds, rivets or pins. This also helps maintain the alignment desired between the holes in the two screens.

Figure 7:
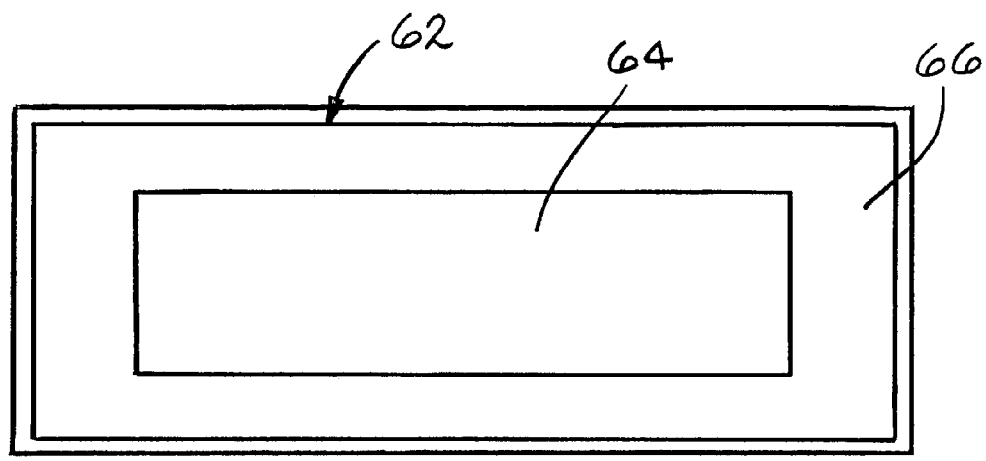
FIG. 7 is a plan view of a bushing screen design according to the present invention for use in the channel position on either side of a channel on bushings whose length runs perpendicular to the length of the bushing leg.
Figure 8:
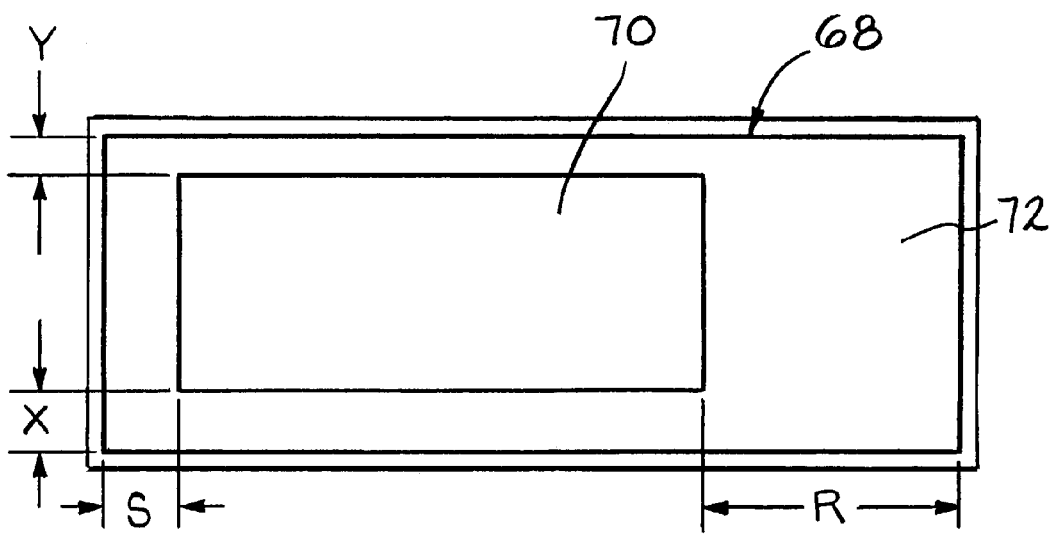
FIG. 8 is a plan view of another bushing screen design according to the present invention for use in the channel position on either side of a channel on bushings whose length runs perpendicular to the length of the bushing leg.

FIGS. 7 and 8 show screens according to the present invention for use in channel position bushings oriented in a leg with the length of the bushing running perpendicular to the length of the leg, like positions 16 in FIG. 1. Screen 62 has a low flow rate portion 64 located in the symmetrical center of the screen 62, and a medium flow rate portion 66 completely surrounding portion 64. The screen 62 also has a peripheral narrow band adjacent the outer edges (not shown) where there are no holes like that of screen 46 shown in FIG. 6.

Usually the hot streak of molten material like glass is not centered in the leg when it arrives at the channel position, but instead is offset to the downstream side from the furnace tank, having just turned almost 90 degrees to enter the leg. Therefore, a more preferred screen design for this type of bushing orientation is shown in FIG. 8. In this embodiment of the invention, a screen 68 has a low flow central portion 70 that is not symmetrically located in the center of the screen 68, but is offset towards the side of the leg that is downstream from the furnace tank and can also be offset in the direction of the upstream end of the leg. Describing this in more detail, a medium flow portion 72 of the screen surrounds the low flow center portion 70 in such a way that dimension X in FIG. 8 is greater than dimension Y and dimension R is greater than dimension S. In this screen 68, the shorter medium flow end portion 72 represented by dimension S would be closest to the leg sidewall that is furthest downstream from the furnace tank and the narrower medium flow side portion 72 represented by dimension Y would be closest to the channel 4, closest to the upstream end of the leg, when the bushing containing this screen is installed in the leg.

In the embodiments of the invention shown in FIGS. 7 and 8, the hole sizes, hole densities and percent open areas in the conventional screen and the low flow portion and medium flow portion of the new screens are the same as described for the screen shown in FIG. 6. Since the size of the furnace, the width of the channel and legs, the design of the entrance to the legs, the exit temperature of the molten material, the pull rate on the furnace and many other factors affect where the optimum location of the low flow portion of the screen should be located for optimum performance, some experimentation using the above disclosure as the guide is necessary for optimization.

The present invention has other uses to give a standard design bushing that is already built, or even in place making fiber, greater capability or better efficiency. Two of these applications include allowing a bushing designed to make coarse fiber to also make fine fiber without rebuilding and allowing a bushing designed to run one kind of glass also run another kind of glass having a completely different fiberizing temperature and temperature-viscosity curve.

A bushing designed to make 16 micron diameter fiber from a hot molten material like molten glass has orifice size in the tips to allow maximum flow rate for whatever fiber pulling speed is desired to achieve maximum productivity. This type of bushing will not run finer fiber like 13 micron and particularly 10 micron diameter at acceptable pull rates and efficiency because the bore in the tips is too large and the flow rate at fiberizing temperature through each tip is too great for the fiber pulling speed capability of the fiber pulling equipment, especially when making direct chop fiber. If customer needs switch from needing more fine fiber and less 16 micron or larger fiber, it has been very expensive to adjust manufacturing equipment to meet such a need. Normally a bushing lasts for 6 to 12 months or more and changing a bushing prematurely is very expensive. Also, once a direct melt bushing has been installed and run, removing it almost always damages the bushing to the extent that it must be cleaned up, remelted and rebuilt because it cannot be reused any other way. This is very expensive.

The present invention allows a bushing designed for 16 micron fiber to run 13 or even 10 micron fiber at close to optimum pull rates and efficiency. This embodiment of the invention is applicable to new, not yet installed direct melt bushings and to marble melt bushings, new or old and running. In this embodiment of the invention a new screen, according to the invention, is laid on top of the existing conventional screen to reduce the flow of molten material through the screen and thus to reduce the head of glass on the tip plate to that suitable to allow the tips with the larger bore to run fine fiber at a normal fiber pulling speed. In this embodiment, the new screen, to be laid on top of the conventional screen, will have a hole density and hole diameter that produces a substantially greater resistance to flow of the molten material than the conventional screen. The hole diameter and hole density can be uniform across the screen or it can be non-uniform to correct cold or hot end problems or other tip plate temperature profile problems if they exist by directing more or less glass into a problem area than into the non-problem areas to improve the profile. It is possible, with certain designs of bushing legs, that a woven wire screen according to the present invention can be inserted into the bushing while running by passing a small screen according to the present invention through the opening in the bottom of the leg and onto the center of the conventional screen in the bushing.

Figure 4:
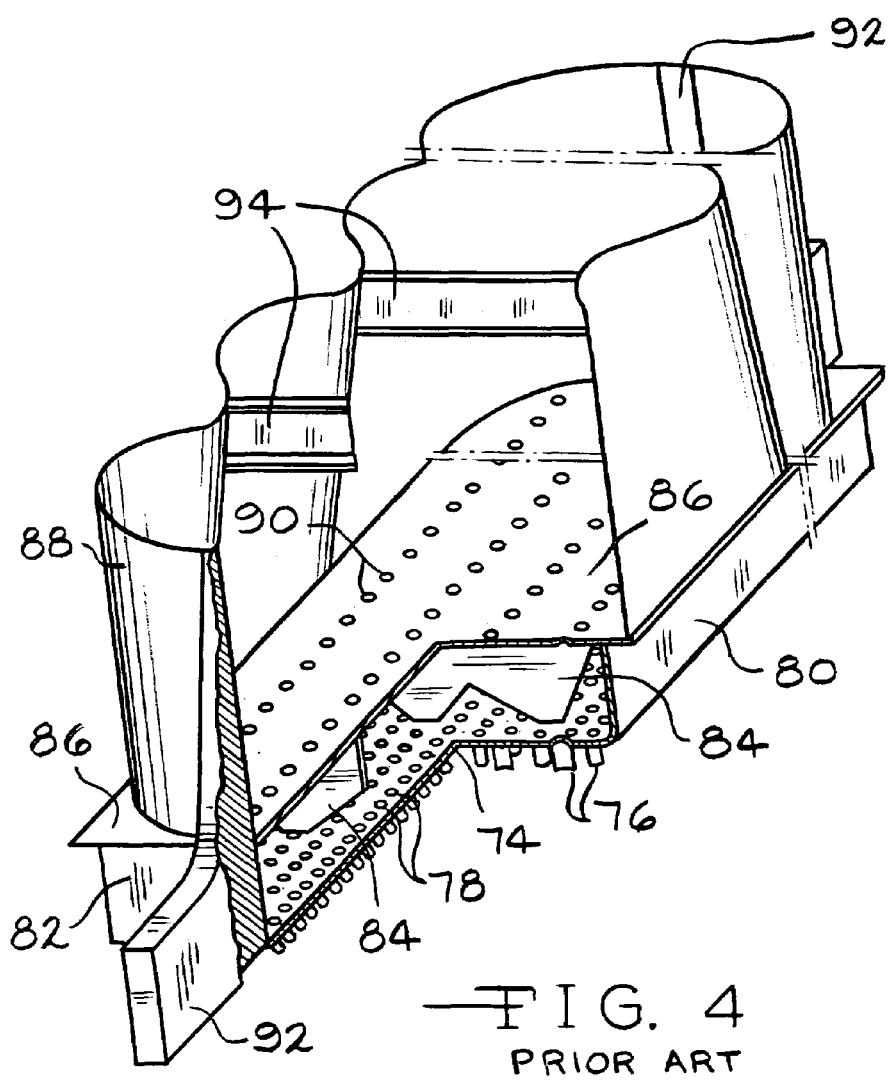
FIG. 4 is a schematic of a conventional marble or pellet melt bushing having a bushing screen with a uniform hole size and density.

FIG. 4 shows a conventional marble or pellet melt bushing having a tip plate 74 with tube tips 76 spaced apart and welded to the tip plate 74 around holes 78 in the tip plate. The tip plate 74 is welded to sidewalls 80 and endwalls 82 and also to internal supports 84. A bottom surface of a screen plate 86 is welded to the tops of the sidewalls 80 and endwalls 82 and to the internal supports 84. A curved enclosure 88, open at the top, is welded to a top surface of the screen 86. The screen 86 has holes or orifices 90 therethrough in the portion of the screen enclosed by enclosure 88. The bushing is made from precious metal like well known platinum-rhodium alloys when used to fiberize high temperature molten materials like glass and is heated by its own resistance by feeding electrical power to the terminals 92 on each end of the bushing. Optional braces 94 can be used to support the side walls of the enclosure to keep them apart during use. This bushing is mounted in a known way by surrounding it with insulating refractory in a stainless steel frame suitable for mounting to steel superstructure.

Glass pellets, marbles, beads, etc. are fed to this bushing after it is heated up and the screen plate 86 gets very hot and melts the glass. When the molten glass becomes hot enough that its viscosity allows it to run through the holes 90, the molten glass flows through the screen and on to the tip plate 74 where it flows through holes 78 and tips 76 to be fiberized in a known way. This bushing is designed not only to make particular fiber diameters, but also to operate on a particular glass, i.e. one having a particular temperature-viscosity relationship. To enable the bushing to melt the cold glass marbles, etc. at a good production rate, the screen plate 86 becomes much hotter than the fiberizing temperature of the molten glass. The size and density of the holes 90 are critical to optimizing the melt rate and fiberizing productivity of any particular fiber diameter and any particular glass. Therefore, a bushing designed for coarse fiber and a particular glass is not practical for making fine fiber or even coarse fiber from a significantly different glass composition.

The present invention allows a marble melt bushing designed for making coarse fiber to be easily and quickly modified, without rebuilding the bushing, so that it can be used to efficiently make finer fiber. A screen plate having a substantially lower flow rate than the conventional screen plate 86 welded into the bushing and a flow rate appropriate to the desired fiber diameter and desired fiber pulling speed is inserted into the bushing and laid on top of the existing screen plate 86. This can be done by first stopping the feed of cold glass to the bushing, heating the bushing to about 50–100 degrees F. hotter than normal running temperature, draining as much of the molten glass as will run out, cooling the bushing, removing it to the workshop to install the screen. When the braces 94 are not used, the new screen according to the present invention can usually be installed while the bushing is in place and hot, though cooled some from operating temperature, after some of the molten glass has been drained from the bushing. When it is desired to use the bushing to again make coarse fiber, the lay-in screen of the present invention can be removed using the same procedure as used to install the new screen.

The invention claimed is:

1. A fiber forming bushing for making fibers from a molten material, said bushing comprising at least one sidewall, a tip plate or orifice plate through which the molten material flows to form the fibers, and a screen having a plurality of holes therethrough and mounted on an interior of the bushing and spaced above a top of the tip plate or orifice plate, said screen being attached to said at least one sidewall, the improvement comprising that said screen has a generally central portion and a peripheral portion surrounding said central portion and the holes in said screen are either located, sized or located and sized to produce a low flow rate of molten material in the generally central portion of the screen and a medium flow rate in a peripheral portion of the screen surrounding said generally central portion.

2. The bushing of claim 1 wherein the screen construction comprises a screen having different thicknesses with a greater thickness in the generally central, low flow portion than the thickness in the peripheral, medium flow portion.

3. The bushing of claim 2 wherein the screen has a lower percentage of hole area in the generally central, low flow portion than a percentage of hole area in the peripheral, medium flow portion.

4. The bushing of claim 3 wherein the generally central portion of the screen has a hole area per unit area of screen that is significantly smaller than a hole area per unit area of screen of the peripheral portion of the screen surrounding the generally central portion.

5. The bushing of claim 4 wherein said molten material is glass and said bushing, including the screen, is made from a precious metal or precious metal alloy with the precious metal being platinum.

6. The bushing of claim 4 wherein said molten material is glass and said generally central portion of the screen is not symmetrically located in the screen.

7. The bushing of claim 4 wherein a percentage of hole area in said generally centrally portion is within a range of about 2.5–6 percent and a percentage of hole area in the peripheral portion is in a range of about 10–16 percent.

8. The bushing of claim 3 wherein said molten material is glass and said bushing, including the screen, is made from a precious metal or precious metal alloy with the precious metal being platinum.

9. The bushing of claim 3 wherein said molten material is glass and said generally central portion of the screen is not symmetrically located in the screen.

10. The bushing of claim 2 wherein the generally central portion of the screen has a hole area per unit area of screen that is significantly smaller than a hole area per unit area of screen of the peripheral portion of the screen surrounding the generally central portion.

11. The bushing of claim 10 wherein said molten material is glass and said bushing, including the screen, is made from a precious metal or precious metal alloy with the precious metal being platinum.

12. The bushing of claim 10 wherein said molten material is glass and said generally central portion of the screen is not symmetrically located in the screen.

13. The bushing of claim 10 wherein a percentage of hole area in said generally centrally portion is within a range of about 2.5–6 percent and a percentage of hole area in the peripheral portion is in a range of about 10–16 percent.

14. The bushing of claim 10 wherein said significantly smaller is at least about 10 percent.

15. The bushing of claim 2 wherein said molten material is glass and said bushing, including the screen, is made from a precious metal or precious metal alloy with the precious metal being platinum.

16. The bushing of claim 2 wherein said molten material is glass and said generally central portion of the screen is not symmetrically located in the screen.

17. The bushing of claim 1 wherein the screen comprises a screen having a lower percentage of hole area in the low flow, generally central portion than a percentage of hole area in the peripheral, medium flow portion.

18. The bushing of claim 17 wherein the generally central portion of the screen has a hole area per unit area of screen that is significantly smaller than a hole area per unit area of screen of the peripheral portion of the screen surrounding thegenerally central portion.

19. The bushing of claim 18 wherein said molten material is glass and said bushing, including the screen, is made from a precious metal or precious metal alloy with the precious metal being platinum.

20. The bushing of claim 18 wherein said molten material is glass and said generally central portion of the screen is not symmetrically located in the screen.

21. The bushing of claim 18 wherein a percentage of hole area in said generally centrally portion is within a range of about 2.5–6 percent and a percentage of hole area in the peripheral portion is in a range of about 10–16 percent.

22. The bushing of claim 17 wherein said molten material is glass and said bushing, including the screen, is made from a precious metal or precious metal alloy with the precious metal being platinum.

23. The bushing of claim 17 wherein said molten material is glass and said generally central portion of the screen is not symmetrically located in the screen.

24. The bushing of claim 1 wherein the generally central portion of the screen has a hole area per unit area of screen that is significantly smaller than a hole area per unit area of screen of the peripheral portion of the screen surrounding the generally central portion.

25. The bushing of claim 24 wherein said molten material is glass and said bushing, including the screen, is made from a precious metal or precious metal alloy with the major portion of said precious metal alloy being platinum.

26. The bushing of claim 24 wherein said molten material is glass and said generally central portion of the screen is not symmetrically located in the screen.

27. The bushing of claim 24 wherein a percentage of hole area in said generally centrally portion is within a range of about 2.5–6 percent and a percentage of hole area in the peripheral portion is in a range of about 10–16 percent.

28. The bushing of claim 24 wherein said significantly smaller is at least about 10 percent.

29. The bushing of claim 24 wherein said significantly smaller is at least about 20 percent.

30. The bushing of claim 24 wherein said significantly smaller is at least about 25 percent.

31. The bushing of claim 24 wherein said significantly smaller is at least about 30 percent.

32. The bushing of claim 1 wherein said molten material is glass and said bushing, including the screen, is made from a precious metal or precious metal alloy with a major portion of said precious metal alloy being platinum.

33. The bushing of claim 1 wherein said molten material is glass and said generally central portion of the screen is not symmetrically located in the screen.

34. A bushing for making fibers from a molten material comprising at least one sidewall, a tip plate or orifice plate through which the molten material flows to form the fibers, and a first screen attached to said at least one sidewall, said first screen being in an interior of the bushing and having holes therethrough and a resistance to flow of said molten material, the improvement comprising a second screen lying on top of said first screen, said second screen having a generally central portion and a peripheral portion surrounding said generally central portion, the generally central portion and the peripheral portion having holes therethrough, said second screen having a resistance to flow of said molten material that is substantially greater than the resistance to flow of said molten material of said first screen, said second screen also having a non-uniform hole diameter, or a non-uniform hole density or both a non-uniform hole diameter and a non-uniform hole density.

35. The bushing of claim 34 wherein the molten material is glass and the bushing including the first screen are made from a precious metal or a precious metal alloy.

36. The bushing of claim 35 wherein said second screen has a generally central portion and a peripheral portion completely surrounding the central portion, the generally central portion having a low flow rate of the molten glass and the peripheral portion having a medium flow rate of the molten glass.

37. The bushing of claim 34 wherein said second screen has a generally central portion and a peripheral portion completely surrounding the generally central portion, the generally central portion having a low flow rate of said molten glass and the peripheral portion having a medium flow rate of the molten glass.

* * * * *